United States Patent
Zipperer

(10) Patent No.: US 8,140,881 B2
(45) Date of Patent: Mar. 20, 2012

(54) CIRCUITRY AND METHOD FOR DETECTION OF NETWORK NODE AGING IN COMMUNICATION NETWORKS

(75) Inventor: Johann Zipperer, Garching (DE)

(73) Assignee: Texas Instruments Deutschland GmbH, Freising (DE)

( * ) Notice: Subject to any disclaimer, the term of this patent is extended or adjusted under 35 U.S.C. 154(b) by 578 days.

(21) Appl. No.: 12/355,286

(22) Filed: Jan. 16, 2009

(65) Prior Publication Data

US 2009/0207864 A1 Aug. 20, 2009

Related U.S. Application Data

(60) Provisional application No. 61/141,811, filed on Dec. 31, 2008.

(30) Foreign Application Priority Data

Jan. 17, 2008 (DE) .......................... 10 2007 033 689
Jan. 17, 2008 (DE) .......................... 10 2008 004 819

(51) Int. Cl.
*G06F 1/12* (2006.01)

(52) U.S. Cl. ........ 713/400; 713/401; 713/500; 713/600; 710/104; 370/257

(58) Field of Classification Search .............. 713/1, 400, 713/401, 500, 600; 710/100, 104; 370/509, 370/516, 257; 327/18, 20, 156, 159
See application file for complete search history.

(56) References Cited

U.S. PATENT DOCUMENTS

| | | | | | |
|---|---|---|---|---|---|
| 5,751,721 | A | * | 5/1998 | Bloks | 370/509 |
| 5,850,514 | A | * | 12/1998 | Gonda et al. | 714/55 |
| 5,968,172 | A | * | 10/1999 | Aleshi | 713/1 |
| 6,134,656 | A | * | 10/2000 | LaBerge | 713/1 |
| 6,252,444 | B1 | * | 6/2001 | Lee | 327/156 |
| 6,266,778 | B1 | * | 7/2001 | Bell | 713/400 |
| 6,480,967 | B1 | * | 11/2002 | Jensen et al. | 713/600 |

(Continued)

FOREIGN PATENT DOCUMENTS

DE 10254405 B3 6/2004

OTHER PUBLICATIONS

Philips Semiconductors. I2C Manual. Application Note. Mar. 24, 2003.*

(Continued)

*Primary Examiner* — Matthew Spittle
(74) *Attorney, Agent, or Firm* — John J. Patti; Wade J. Brady, III; Frederick J. Telecky, Jr.

(57) ABSTRACT

The network node includes a local crystal oscillator for providing a time reference derived from the clock signal produced by the local crystal oscillator, a reset stage for resetting the network node in response to a bus reset pulse received through the network and a control means for issuing a bus reset pulse of a predetermined length substantially greater than a clock period of the clock signal of the local crystal oscillator. Further the network node includes a bus reset detector for determining a length of the received bus reset pulse based on the local time reference. The bus reset detector in the network node is also adapted to adjust the local time reference based on the determined length of the received bus reset pulse.

10 Claims, 1 Drawing Sheet

U.S. PATENT DOCUMENTS

| | | | |
|---|---|---|---|
| 6,529,977 B1 * | 3/2003 | Nyu | 710/100 |
| 6,530,029 B1 * | 3/2003 | Metchev | 713/500 |
| 6,557,108 B1 * | 4/2003 | Moore et al. | 713/500 |
| 6,618,361 B1 * | 9/2003 | Park | 370/257 |
| 6,684,285 B2 * | 1/2004 | Farmwald et al. | 710/305 |
| 6,782,485 B2 * | 8/2004 | Takai | 713/500 |
| 6,968,472 B2 * | 11/2005 | Fernald | 713/400 |
| 7,039,823 B2 * | 5/2006 | Hales et al. | 713/400 |
| 7,126,559 B2 * | 10/2006 | Su et al. | 345/46 |
| 7,200,767 B2 * | 4/2007 | Jonnalagadda | 713/400 |
| 7,260,166 B2 * | 8/2007 | Sweet | 375/354 |
| 7,325,152 B2 * | 1/2008 | Wallner et al. | 713/401 |
| 7,366,938 B2 * | 4/2008 | Warren et al. | 713/400 |
| 7,444,606 B2 * | 10/2008 | Kosugi et al. | 716/113 |
| 7,831,855 B2 * | 11/2010 | Deschamp et al. | 713/500 |
| 2011/0022897 A1 * | 1/2011 | Marshall et al. | 714/40 |

OTHER PUBLICATIONS

IEEE. High Performance Serial Bus. Supplement. P1394b Draft 1.05. Nov. 22, 2000.*

Atmel Corporation. 80C51 Microcontrollers. Application Note. 2003.*

Deutsches Patent und Markenamt, Office Action issued regarding German Patent Application DE 10 2008 004 819.4 dated Jan. 17, 2008.

* cited by examiner

CIRCUITRY AND METHOD FOR DETECTION OF NETWORK NODE AGING IN COMMUNICATION NETWORKS

CROSS-REFERENCE TO RELATED APPLICATIONS

This application claims priority from German Patent Application No. 10 2008 004 819.4, filed 17 Jan. 2008, and from U.S. Provisional Patent Application No. 61/141,811, filed 31 Dec. 2008.

FIELD OF THE INVENTION

The present invention relates to an electronic device and a method for a data communication network with point-to-point connection, more specifically to a network according to the IEEE 1394 Standard.

BACKGROUND

A well-known principle of communicating data between different electronic devices is a so-called "point-to-point" connection, as for example described by the IEEE 1394 Standard. According to this standard, and also for other logical buses, the data is repeated by each node from the incoming cable segment to the outgoing cable segments. The incoming data is synchronized and retimed by use of a local crystal oscillator present in each of the respective nodes. In order to achieve high data integrity, the data propagating through the network from node to node must be synchronized. The synchronization is performed at the beginning of each data packet. After synchronization, the bits are sampled in the middle of their pulses. However, two network nodes never have exactly the same oscillator frequency, so that the position in time at which the bits are sampled shifts either to the beginning or to the end of each data bit. The longer a data packet is, the further away from the center a bit is sampled, which is at the end of the packet. In order to guarantee data integrity, a specific maximum tolerance of the oscillation frequency of the local oscillator is defined. For example, for the IEEE 1394 Standard, the crystal oscillator tolerance should be less than +/−100 ppm. Accordingly, the maximum difference between two nodes can be 200 ppm. In other words, for a bit length of 2500 bits can be sampled without leaving the tolerance range, i.e. without introducing an error, including a margin of ½ bit. This corresponds to a data packet of 312 bytes, which can be transmitted without an error. In order to transmit larger packets, an internal retiming circuit is used that allows larger packets to be sent and received without an error. However, if the local oscillators in the network nodes vary in their frequency by more than 100 ppm, only reduced data packet sizes can be used. Tolerances of the oscillation frequencies of the local oscillators can vary widely due to aging or temperature effects. Also, local oscillators having very stable oscillation frequencies are expensive and complex. In order to handle aging or temperature effects, protection circuits are used, which compare the exact bit rate from the incoming packets with the exact bit rate of the outgoing data packets. Yet, new applications and standards for point-to-point networks have to support different speeds and they have to be idle when no data is transmitted, so that a comparison of the data bit rates is impractical.

SUMMARY

It is an object of the present invention to provide an electronic data communication system and a corresponding method of operating the data communication system that can handle temperature and aging effects of the local oscillators and relaxes the requirements for the local oscillators.

According to an aspect of the present invention, a data communication network is provided, which includes a network node. The network node includes a local crystal oscillator for providing a time reference derived from the clock signal produced by the local crystal oscillator, a reset stage for resetting the network node in response to a bus reset pulse received through the network, and a control means for issuing a bus reset pulse of a predetermined length substantially greater than a clock period of the clock signal of the local crystal oscillator. Further the network node includes a bus reset detector for determining a length of the received bus reset pulse based on the local time reference. The bus reset detector in the network node is also adapted to adjust the local time reference based on the determined length of the received bus reset pulse. This aspect of the present invention is based on the recognition that point-to-point networks having multiple network nodes and communication lines connecting the network nodes typically use a bus reset pulse for resetting the network nodes, which has a length of time that is a multiple of the clock periods of the local oscillators in each node. Accordingly, as the bus reset pulse has a predetermined length, it is possible to measure the length of the bus reset pulse in each network node by use of the clock periods of the internal local oscillator. If the measurement result shows that the bus reset pulse is too long or too short, this can be used as an indicator for a deviation of the clock frequency of the local oscillator. Accordingly, the oscillation frequency of the local oscillator can be adjusted directly or by means of a logic circuitry coupled to the local oscillator which produces a corrected clock signal having the correct clock period or oscillating frequency.

According to an aspect of the present invention, each network node includes a start and stop logic and a timer for comparing the length of the received bus reset pulse with a length of a bus reset pulse generated in the same (i.e., own or local network node. Accordingly, the time difference determined by this comparison is a qualifier of the clock accuracy and therefore a value to estimate the signal integrity that can be expected. Also, using a start and stop logic and a timer, which starts when one of the two bus reset pulses ends, and stops when the other of the two bus reset pulses ends, allows complexity of the network node to be reduced.

Still further, each network node can include a safe bus reset indicator, which ensures that the timer is only activated if a true bus reset signal is received. The above aspects of the present invention are particularly useful for high availability systems and high safety systems, such as telecommunication, automotive or robotic systems, which need an early indication if the level of data integrity decreases.

According to still another aspect of the present invention, the difference of the length of the two bus reset pulses can be measured as an absolute value or as a binary signal, which is to be compared with a maximum value.

Preferably, the ratio of the length of the reset pulse and the clock period of the clock signal provided by the local oscillator is greater than several hundred, in particular 500 or more. More specifically, the bus reset pulse can be 125 µs or 166 µs and the clock frequency of the crystal oscillator can be about 25 MHz. The exact value may be 24.576 MHz. These configurations allow the difference of the bus reset pulses to be determined precisely. Preferably, the communication lines consist of two or more data lines. There may be several optional power supply lines. The data communication lines can then be all set low over the whole length of a reset pulse.

The aspects of the present invention are advantageously applicable to a data communication system in line with the IEEE 1394 Standard or any other serial bus connection.

Preferably, a network node according to the present invention can include means to issue a reset pulse, at any time the network is reconfigured, in particular, if network nodes are added or removed from the network. Further, the network node can be configured to issue a reset pulse every time the network node is activated. This allows the deviation of the internal time reference of the network node to be monitored continuously.

The present invention also relates to a method of operating a data communication network. The method comprises using a local crystal oscillator as a local time reference for the data communication in a network node, receiving a bus reset pulse at the network node, which is substantially longer than a period of the local crystal oscillator, determining a length of the received bus reset pulse in the network node, and adjusting the local time reference in the network node based on the determined length of the received bus reset pulse. Accordingly, any timing differences between multiple network nodes due to aging effects of the local oscillator can be compensated. According to another aspect of the present invention, the measurement of the length of the bus reset pulse in one network node can include comparing of a bus reset pulse received from another network node with the length of a bus reset pulse internally generated in the same network node.

According to still other aspects of the invention, while determining the length of the bus reset, the temperature of the network node (e.g. the integrated electronic device used as network node) can be measured. Accordingly, the influence of the temperature can be considered when the deviation of the local time reference is assessed. Further, the measurement of the length of a bus reset pulses can be based on statistical considerations, such that, for example, an average value, a standard deviation or the like is considered before the local time reference will be definitely changed. This can provide an increased reliability and robustness of the network.

Generally, the present invention relates to a data communication system including a network and network nodes as described herein above. Using a network node and the method according to the present invention, allows the local time references of the network nodes to be adjusted. However, if multiple network nodes are present, all of which have the same aging effects, and the network nodes only exchange reset pulses among each other, it is possible that adjustment of the local time reference is not possible. For example, all network nodes may have an aging or temperature dependent behavior that renders the reset pulses longer. In this situation, the network nodes may not be able to adjust their internal time reference. However, the network will still function properly, as the data transmitted between the nodes is all based on the same, but changed time basis.

BRIEF DESCRIPTION OF THE DRAWINGS

Further aspects of the present invention will ensue from the description hereinbelow of the preferred embodiments with reference to the accompanying drawings, in which.

DETAILED DESCRIPTION

Figure 1:
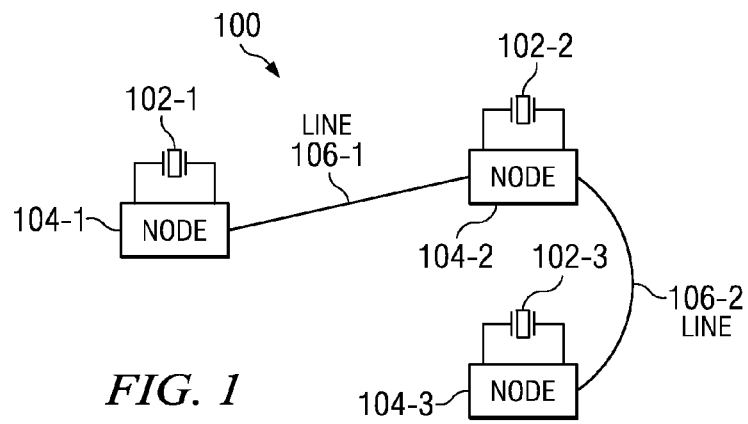
FIG. 1 shows an example of a data communication in accordance with an embodiment of the present invention.

Refer now to the drawings wherein depicted elements are, for the sake of clarity, not necessarily shown to scale and wherein like or similar elements are designated by the same reference numeral through the several views.

Turning to FIG. 1, a simplified block diagram of an example of a communication network 100 in accordance with an embodiment of the present invention can be seen. As shown, network nodes 104-1 to 104-3 are coupled together by data communication lines 106-1 and 106-2. The communication network 100 can be a typical point-to-point communication network, in which data is transmitted from a first network node 104-1 via data communication line 106-1 to a second network node 104-2 and from network node 104-2 via communication line 106-2 to network node 104-3. Each network node 104-1 to 104-3 includes a crystal oscillator 102-1 to 102-3, respectively, as a local time reference for incoming and outgoing data. At start-up, and also during operation, a bus reset pulse BR can be produced by any of the network nodes 104-1 to 104-3. The bus reset pulse BR propagates through the data communication lines 106-1 and 106-2 from one network node to the other. A network node (i.e., node 104-2) receives the bus reset pulse BR, readjusts, and synchronizes the bus reset pulse with the internal clock signal produced by the local crystal oscillator (i.e., 102-2), and the node (i.e., 102-2) transmits the bus reset pulse to another network node (i.e., node 104-3) in the data communication network 100. However, due to aging, temperature variations, insufficient accuracy, or other issues of the crystal oscillators 102-1 to 102-3, the length of the data packets transmitted in the data communication network 100 is generally restricted. In the worst case, errors can occur when the deviation from network node (i.e., 104-1) to network node (i.e., 104-2) becomes too large. Nodes 104-1 to 104-3, however, can correct for these errors.

Figure 2:
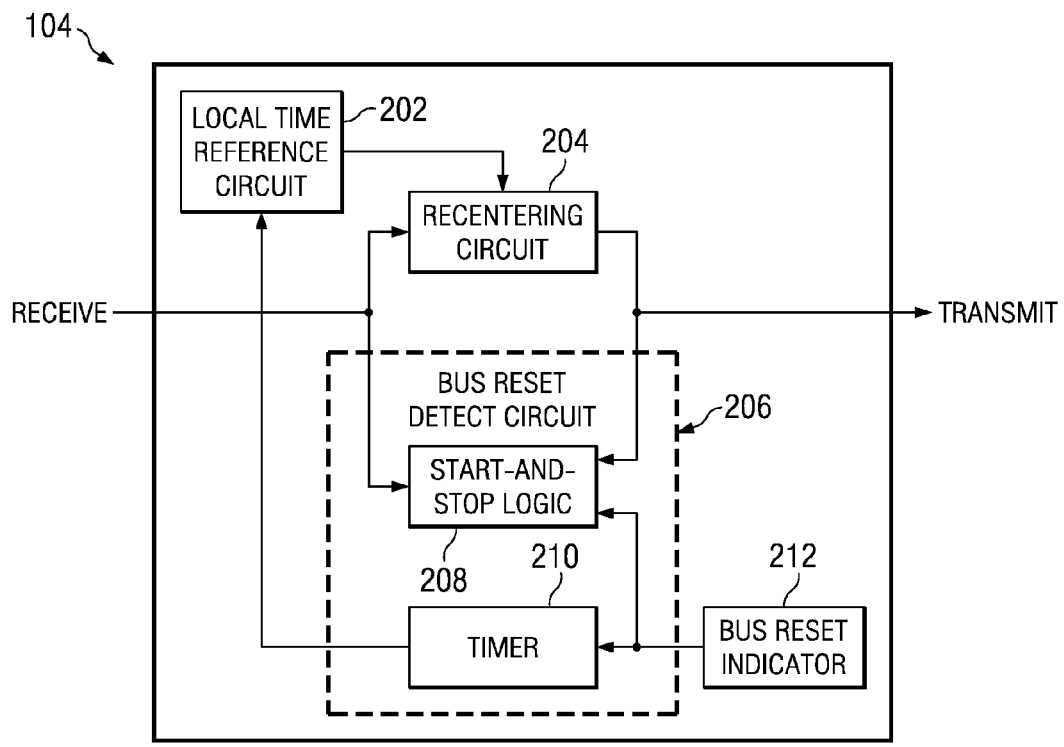
FIG. 2 shows a simplified block diagram of an example of a network node of FIG. 1.

In FIG. 2, an example of the nodes 104-1 to 104-3 (labeled 104 for FIG. 2) of FIG. 1 can be seen in greater detail. As shown, the network node 104 generally comprises a local time reference circuit 202, a recentering circuit 204, a bus reset detect circuit 206 (which can generally include start-and-stop logic 208, and a timer 210), and a bus reset indicator 212. The local time reference circuit 202 can include, for example, a crystal oscillator (i.e., 102-1) and additional logic circuitry for providing a stable time reference for the network node 104. The local time reference is, for example, used in the retiming and recentering circuit 204, where data is received, sampled, retimed, and recentered in accordance with the local time reference and sent to another network node through output TRANSMIT. Data can also be received through input RECEIVE. If a bus reset pulse was safely detected by the bus reset indicator 212, the start-and-stop logic 208 attempts to detect the end of the bus reset pulse. An internal bus reset pulse is synchronously generated to the start of an external bus reset pulse and compared with the external bus reset pulse in the start-and-stop logic 208. When the first bus reset pulse ends, the timer 210 is started. When the second bus reset pulse ends, the timer 210 stops. Accordingly, the timer 210 includes the time difference between the first and the second bus reset pulses, one being the internal bus reset pulse and the other the external bus reset pulse. Based on the measurement result in the timer 210, the local time reference in the local time reference circuit 202 can be adjusted.

Figure 3:
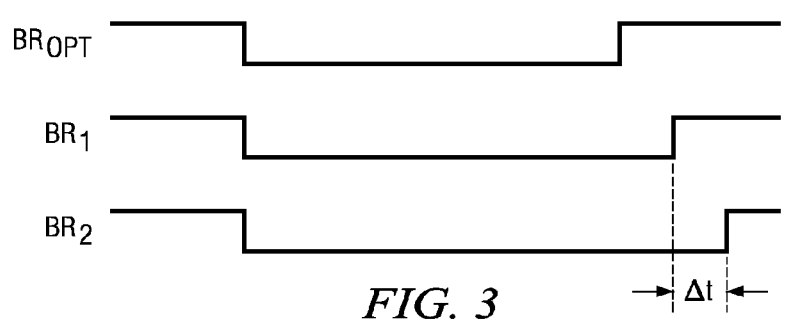
FIG. 3 shows waveforms illustrating different bus reset pulses.

Turning to FIG. 3, waveforms illustrating three different bus reset pulses can be seen. signal $BR_{OPT}$ represents a bus reset pulse having an optimum length. Signal $BR_1$ represents a bus reset pulse being internally generated in a network node (i.e., 104-1), and signal $BR_2$ represents the bus reset pulse generated by another network node (i.e., 104-2) received by network node (i.e., 104-1). The comparison of the two network nodes (i.e., 104-1 and 104-2) performed in the bus reset detection circuit 206 provides a time difference Δt. Based on this time difference Δt, it is possible to readjust the internal local time reference circuit in network node (i.e., 104-1). It is also possible to base the measurement of the time difference between the two bus reset pulses on an internal temperature measurement in the network node (i.e., 104-1). Also, statistical deviations and distributions can be included in the evaluation of the bus reset pulse lengths. However, if both network nodes (i.e., 104-1 and 104-2), which provide signals $BR_1$ and $BR_2$ deviate from the optimum local time difference, as shown in FIG. 3, than the optimum length $BR_{OPT}$ cannot be achieved. The common error of all network nodes, which participate in the data communication in the network 100, will prevail. However, the data communication is not affected by any common change in the time reference, as the data will be sampled correctly in all the network nodes.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Accordingly, it is appropriate that the appended claims be construed broadly and in a manner consistent with the scope of the invention.

The invention claimed is:

1. A data communication network comprising a network node that includes:
   a crystal oscillator that provides a local time reference derived from a clock signal produced by the crystal oscillator;
   a reset circuit that resets the network node in response to a first bus reset pulse received through the network;
   a controller that issues a second bus reset pulse of a predetermined length substantially greater than a clock period of the clock signal of the crystal oscillator; and
   a bus reset detector that determines a length of the first bus reset pulse based on the local time reference and that adjusts the local time reference based on the determined length of the first bus reset pulse.

2. The data communication network according to claim 1, wherein the network node further comprises start and stop logic that compares the length of the first bus reset pulse with the length of the second bus reset pulse.

3. The data communication network according to claim 1, wherein the network nodes further comprises a timer to measure the time difference of the first and second bus reset pulses.

4. The data communication network according to claim 1, wherein the ratio of the lengths of the first and second bus reset pulses and the clock period of the clock signal provided by the crystal oscillator is greater than 500.

5. The data communication network according to claim 1, wherein the length of the first bus reset pulse is 125 μs or 166 μs and the clock frequency of the crystal oscillator is about 25 MHz, and in particular 24.576 MHz.

6. The data communication network according to claim 1, wherein the network node further comprises first and second network nodes, and wherein the network further comprises a communication line that couples the first and second network nodes together, wherein the communication line comprises at least two data lines.

7. The data communication network according to claim 6, wherein the data lines are set LOW over the whole length of the first reset pulse.

8. The data communication network according to claim 1, wherein the network is built in accordance with the IEEE 1394 Standard.

9. The data communication network according to claim 1, wherein the network is adapted to determine a temperature of the network node while determining the length of the first bus reset pulse and to consider the influence of the temperature when assessing a deviation of the local time reference.

10. The data communication network according to claim 1, wherein the network is adapted to evaluate the length of the second bus reset pulse statistically before adjusting the local time reference.

* * * * *